United States Patent [19]

Cobb

[11] Patent Number: 4,676,515
[45] Date of Patent: Jun. 30, 1987

[54] COMPOSITE EMBOSSED SANDWICH GASKET WITH GRAPHITE LAYER

[75] Inventor: David A. Cobb, Hazelcrest, Ill.

[73] Assignee: Felt Products Mfg. Co., Skokie, Ill.

[21] Appl. No.: 932,582

[22] Filed: Nov. 20, 1986

[51] Int. Cl.⁴ .............................................. F16J 15/12
[52] U.S. Cl. .............................. 277/235 B; 277/211;
277/DIG. 6
[58] Field of Search ............. 277/235 B, DIG. 6, 166,
277/235 R, 235 A, 211, 236

[56] References Cited

U.S. PATENT DOCUMENTS

| | | | |
|---|---|---|---|
| 2,152,630 | 4/1939 | Balfe | 277/235 R |
| 3,404,061 | 10/1968 | Shane et al. | 277/DIG. 6 X |
| 3,841,289 | 10/1974 | Meyers | 277/235 B X |
| 4,140,323 | 2/1979 | Jacobs | 277/166 |
| 4,397,472 | 8/1983 | Czernik | 277/235 B |
| 4,457,491 | 7/1984 | Dudman | |
| 4,471,968 | 9/1984 | Schlaupitz et al. | 277/235 B |

FOREIGN PATENT DOCUMENTS 2053382  2/1981  United Kingdom ............ 277/235 B

OTHER PUBLICATIONS

Ishino Gasket Mfg. Co., Ltd. brochure-"High Heat-Resistant Composite Gasket," 4 pp., no date.

Primary Examiner—Robert S. Ward
Attorney, Agent, or Firm—Dressler, Goldsmith, Shore, Sutker & Milnamow Ltd.

[57] ABSTRACT

A gasket, such as an exhaust manifold gasket, having improved recovery, sealability and stiffness characteristics. The gasket has two embossed metallic layers and an intermediate compressed expanded graphite layer having a density of at least about 70 pounds per cubic foot. The embossments of the metallic layers are vertically aligned, the vertically aligned embossments extending in the same direction. The embossments are positioned around a clear-through service aperture.

6 Claims, 3 Drawing Figures

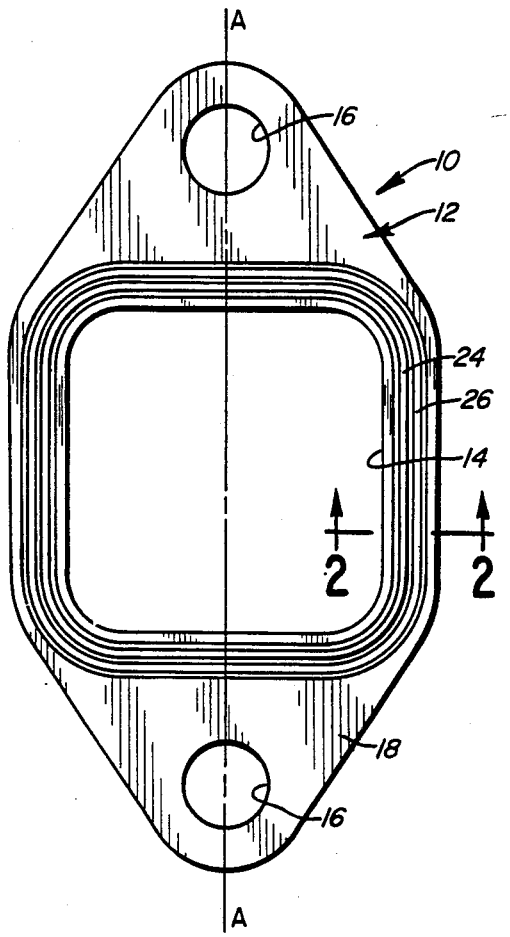
FIG. 1
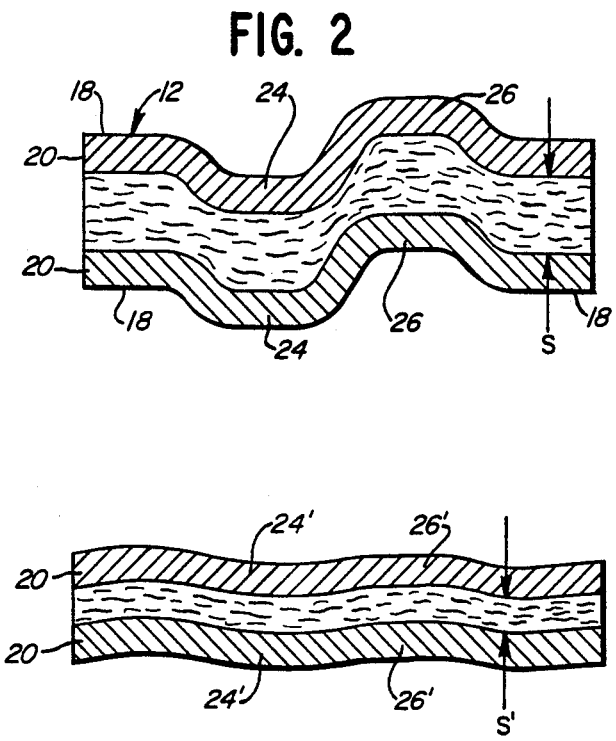
FIG. 2
FIG. 3

COMPOSITE EMBOSSED SANDWICH GASKET WITH GRAPHITE LAYER

BACKGROUND OF THE INVENTION

This invention relates to improvements in embossed gaskets.

Embossed gaskets are widely used for a variety of purposes. The embossments, selected zones embossed out of the main plane of the gaskets, are intended to provide a relatively higher unit sealing stress in a localized zone, such as in an annular pattern around an opening to be sealed, than would a flat unembossed gasket itself.

Unsupported embossments tend to flatten. Further, unsupported embossments also tend to have limited recovery characteristics. As such, the prior art, such as Jacobs U.S. Pat. No. 4,130,323, has suggested the filling of embossments, such as with a sealant, to support embossments. However, the filling of embossments, as by silk-screening or otherwise is an expensive procedure and has other limitations associated with it.

It would therefore be desirable to inexpensively produce an embossed gasket with high unit sealing stress in the zone of the embossment under compression and with relatively high recovery.

SUMMARY OF THE INVENTION

In accordance with the present invention an improved gasket, such as an exhaust manifold gasket, is provided. The gasket comprises a first generally flat metallic layer, a second generally flat metallic layer, an embossment defined by each of the metallic layers and projecting outwardly of the planes of the metallic layers, the embossments being vertically aligned and projecting outwardly of the planes in the same direction, a layer of compressed expanded graphite disposed between and laminated to the metallic layers in the zone of the embossments, the graphite layer being of a density of at least 70 pounds per cubic foot, and a clear-through service aperture defined by the gasket and surrounded by the embossments.

Desirably the metallic layers each define a second embossment surrounding the clear-through service aperture, and the second embossments are vertically aligned and project outwardly of the planes in the same direction. Preferably the second embossments project outwardly in a direction opposite to the direction in which the first embossments project.

Further objects, features and advantages of the present invention will become apparent from the following description and drawings.

BRIEF DESCRIPTION OF THE DRAWINGS

FIG. 1 is a plan view of an exhaust manifold gasket in accordance with the present invention;

FIG. 2 is an enlarged cross-sectional view of the gasket of FIG. 1 taken substantially along line 2—2 of FIG. 1; and FIG. 3 is a view, like FIG. 2, but after the gasket of FIG. 1 has been compressed in service between a pair of mating surfaces and then removed from service use.

DESCRIPTION OF A PRESENTLY PREFERRED EMBODIMENT

Referring now to the drawings, a gasket such as an exhaust manifold gasket 10 of the present invention is shown in FIG. 1 to comprise a main body 12 defining a clear-through service aperture 14 and a pair of bolt holes 16 through which bolts (not shown) may pass to tightly clamp a pair of confronting flanges (not shown) against the faces 18 of the gasket 10. The gasket 10 which is shown is symmetrical about a longitudinal axis A—A.

The main body 12 comprises a laminated assembly comprising a pair of metallic layers 20 and, sandwiched therebetween, a layer of compressed expanded graphite 22 at least in the zone of the embossments and preferably substantially coextensive with the metallic layers. As seen in FIG. 2 the face 18 of each metallic layer 20 is generally flat but defines a pair of embossments which are intended to parallel and which surround the service aperture 14 and which are formed outwardly from the opposite faces 18 of the metallic layer 20. Thus, each layer 20 defines a first embossment 24 which projects outwardly and downwardly from the plane of, and beyond the face of, the layer 20, and a second adjacent embossment 26 which projects outwardly and upwardly from the plane of, and beyond the face of, the layer 20.

For convenience, each of the metallic layers 20 may be identical and, as seen, each is disposed relative to the other in a nested overlying relationship rather than a relationship in which, for example, the embossments 26 would be closer to each other than would be the embossments 24. Thus, the embossments 24 are vertically aligned and the embossments 26 are vertically aligned, each pair projecting outwardly of the planes of the metallic layers, but in opposite directions. Hence, as illustrated by FIG. 2, the space S between the metallic layers 20 is fairly uniform throughout the extent of the metallic layers.

As also shown by FIG. 2, the graphite layer 22 substantially fills the space between the metallic layers 20 and assumes the shape of the space S therebetween. In the assembly of the gasket 10 a generally flat sheet of compressed expanded graphite which, when assembled assumes a shape like that of the metallic layers, is formed and is positioned between a pair of embossed layers 20, as with a suitable adhesive. The assembly is then compressed sufficiently to assume the configuration as shown in FIG. 2, but without substantial compression of the expanded graphite layer. Thus, the expanded graphite layer may have a density of about 70 pounds per cubic foot prior to assembly and the density may remain much the same when the laminated assembly as illustrated by FIG. 2 is completed, although it is apparent that some compression and some localized compression may take place during assembly and manufacture.

A typical manifold exhaust gasket of the type illustrated may be about 4.25 inches by about 2.4 inches with a service aperture 14 being about 1.75 inches square with rounded corners. The metallic layers 20 may be about 0.015 inch thick and of stainless steel. The embossments may extend about 0.020 inch out of the planes of the metallic layer (both above and below) and may have widths of about 0.11 inch at their bases. Other thicknesses and embossment dimensions may be used as well.

The compressed expanded graphite may have a density of about 70 pounds per cubic foot and may have a pre-assembled sheet thickness of about 0.025 inch. Other thicknesses and densities may be used as well.

A suitable compressed flexible, expanded graphite material is available from Calcarbon, a division of Polycarbon, Inc. under the name Calgraph A. A typical Calgraph A comprises a minimum of about 98% graphite and about 2% ash maximum at 950° C. (ASTM C-561) and has a density of about 70 pounds per cubic foot. The material is essentially devoid of binders, resins, fillers and additives. A like material is said by Union Carbide Corporation to be made in accordance with U.S. Pat. No. 3,404,061. Such materials may be formed into sheets, then die-cut into the desired shape and then further compressed to the desired density. Thus 70 pound per cubic foot sheet material may be cut into suitable gasket shapes for assembly with the metallic layers, later to be further compressed, if desired, and laminated with the metallic layers.

When the exhaust manifold gasket 10 is placed in service, i.e., is positioned between an appropriate pair of clamping flanges, the embossments flatten somewhat and the expanded graphite is compressed substantially, as from a density of about 70 pounds per cubic foot to a density of at least about 110 pounds per cubic foot or more. Because of the nature of the expanded graphite material, it does not extrude and therefore remains in place to contribute its sealing effect to the gasket and especially in the zone of the embossments to stiffen them and to increase sealability thereat. As the compressed expanded graphite becomes denser, the graphite exhibits increasingly greater recovery characteristics and, when highly compressed, it exhibits a relatively high recovery, contributing significantly to effective sealing over a long period. Further, because compressed expanded graphite material is temperature and chemical resistant, it need not be protected and does not deteriorate in use, as in exhaust manifold gaskets.

After the gasket of FIGS. 1 and 2 has been removed from service, it typically looks, in section, like what is illustrated by FIG. 3. Thus metallic layers 20 define substantially flattened embossments 24', 26' with the graphite layer 22 having been substantially reduced in thickness to a thickness S', hence substantially increased in density.

The sealing characteristics of an exhaust manifold gasket as described herein were found to be excellent. The gasket was found to have a higher sealing stress at the head-flange interface, producing improved sealing characteristics. The gasket exhibited greater recovery when the load was removed than did conventional exhaust manifold gaskets of which the individual metallic layers are typical. Further, the increased stiffness of the gasket as compared to the prior art prevented the bead from collapsing during recovery. Thus the graphite prevented the embossments from more fully collapsing, while contributing to the maintenance of good embossment contact with the mating flange surfaces. The gasket assembly also exhibited both higher unit sealing stress under compression in the zones of the embossments as well as much higher recovery than is typically available from conventional similarly embossed metallic gaskets.

The principles of the present invention may be applied to other gaskets, such as head gaskets and other combustion seals, turbocharger mounting gaskets, among others, and therefore the invention is not limited to use in exhaust manifold gaskets.

Although but one embodiment of the invention have been shown and described, it is to be understood that the various modifications and substitutions may be made by those skilled in the art without departing from the novel spirit and scope of the invention, and accordingly the invention is intended to embrace all modifications within the scope of the appended claims.

What is claimed is:

1. A gasket having improved recovery, sealability and stiffness characteristics comprising:
    a first generally flat metallic layer,
    a second generally flat metallic layer,
    an embossment defined by each of said metallic layers and projecting outwardly of the planes of the metallic layers, said embossments being vertically aligned and projecting outwardly of said planes in the same direction,
    a layer of compressed expanded graphite disposed between and laminated to said metallic layers in the zone of the embossments, and being of a density of at least about 70 pounds per cubic foot, and
    a clear-through service aperture defined by said gasket and surrounded by said embossments.

2. A gasket in accordance with claim 1, and wherein said metallic layers each define a second embossment surrounding said clear-through service aperture, said second embossments being vertically aligned and projecting outwardly of said planes in the same direction.

3. A gasket in accordance with claim 2, and wherein said second embossments project outwardly in a direction opposite to the direction of said first embossments.

4. A gasket in accordance with claim 3, and wherein said gasket is an exhaust manifold gasket.

5. A gasket in accordance with claim 3, and wherein said compressed expanded graphite layer is compressed to at least about 110 pounds per cubic foot.

6. A gasket in accordance with claim 5, and wherein said gasket is an exhaust manifold gasket.

* * * * *